US006877937B2

(12) United States Patent
Hsiao

(10) Patent No.: US 6,877,937 B2
(45) Date of Patent: Apr. 12, 2005

(54) REVERSIBLE DRILL/DRIVER TOOL

(76) Inventor: Chieh-Jen Hsiao, 2F, No. 215, Yu-Te Rd., Pei Dist., Taichung City (TW)

( * ) Notice: Subject to any disclaimer, the term of this patent is extended or adjusted under 35 U.S.C. 154(b) by 238 days.

(21) Appl. No.: 10/372,384

(22) Filed: Feb. 21, 2003

(65) Prior Publication Data

US 2004/0096286 A1 May 20, 2004

(30) Foreign Application Priority Data

Nov. 19, 2002 (TW) ...................................... 91218569 U

(51) Int. Cl.[7] ................................................ B23B 31/02
(52) U.S. Cl. .......................................... 408/238; 279/14
(58) Field of Search ........................... 408/238; 279/14; 7/165, 168, 901, 158

(56) References Cited

U.S. PATENT DOCUMENTS 1,697,414 A * 1/1929 Roy ............................ 279/14
3,013,594 A * 12/1961 Nehls .......................... 81/440
4,512,693 A * 4/1985 Swanson ................ 408/239 R
4,676,703 A * 6/1987 Swanson ................ 408/239 R
5,586,847 A * 12/1996 Mattern et al. ......... 408/239 A
5,779,404 A * 7/1998 Jore ....................... 408/239 R
6,325,393 B1 * 12/2001 Chen et al. .................... 279/22
6,394,715 B1 * 5/2002 Boyle et al. ................ 408/238
6,488,452 B1 * 12/2002 Hoskins et al. ......... 408/239 R
6,761,361 B2 * 7/2004 Taylor et al. ................. 279/75

* cited by examiner

*Primary Examiner*—Daniel W. Howell
*Assistant Examiner*—J Wiliams
(74) *Attorney, Agent, or Firm*—Allston L. Jones

(57) ABSTRACT

A reversible drill/driver tool includes an elongated socket having a bifurcated part defining a tool-receiving space to receive a two-ended tool that includes first and second driving bits and a rod having two opposite ends connected respectively to the first and second driving bits, and pivoted to the bifurcated part so as to be rotatable relative to the socket and so as to dispose a selected one of the first and second driving bits outwardly of the space. A positioning member is slidable on the socket to position the rod at a desired position.

5 Claims, 9 Drawing Sheets

REVERSIBLE DRILL/DRIVER TOOL

RELATED APPLICATION

This application claims priority from Taiwanese Patent Application having serial number 091218569 filed Nov. 19, 2002.

BACKGROUND OF THE INVENTION

1. Field of the Invention

The present invention relates to a reversible drill/driver tool, more particularly to one including a reversible two-ended tool assembly, and an elongated socket receiving the tool assembly therein in such a manner as to facilitate position change of two driving bits mounted at two opposite ends of the two-ended tool assembly.

2. Description of the Related Art

Referring to FIGS. 1 to 3, a conventional reversible drill/driver tool is adapted to be mounted on a chuck of a powered drill (not shown), and is shown to include an elongated socket 1 having a first end section 102 and a second end section 101 defining a tool-receiving space 100 to receive a reversible two-ended tool assembly 2. A drive shank 1021 is fixed to the first end section 102 of the elongated socket 1 and is adapted to be gripped firmly by the chuck of the powered drill. A positioning member 4 is sleeved slidably on the elongated socket 1. A locking ball unit 3 is disposed between the two-ended tool assembly 2 and the positioning member 4. The positioning member 4 is slidable on the elongated socket 1 between a locked position, as best shown in FIG. 2, where the positioning member 4 presses the locking ball 3 through a hole 1011 formed in the second end section 101 of the elongated socket 1 to engage a concave recess 2012 formed in an elongated rod 2011 of the two-ended tool assembly 2, thereby securing the two-ended tool assembly 2 to the elongated socket 1, and an unlocked position, as best shown in FIG. 3, where a concave recess 401 formed in the positioning member 4 is aligned with the hole 1011 in the elongated socket 1 so as to permit movement of the locking ball 3 into the recess 401 upon outward pulling of the two-ended tool assembly 2 from the tool-receiving space 100, which, in turn, results in disengagement of the locking ball 3 from the recess 2012 in the elongated rod 2011, thereby permitting removal of the two-ended tool assembly 2 from the elongated socket 1. As such, it is relatively inconvenient and laborious to change the position of first and second driving bits 202, 203 of the two-ended tool assembly 2 in the elongated socket 1.

SUMMARY OF THE INVENTION

Therefore, the object of this invention is to provide a reversible drill/driver tool having an elongated socket that receives a reversible two-ended tool assembly in such a manner that changing position of two driving bits mounted on opposite end sections of the two-ended tool assembly can be easily conducted as compared with that of the conventional reversible drill/driver tool.

According to the present invention, a reversible drill/driver tool for a powered drill includes: an elongated socket including a cylindrical part, and a bifurcated part having two spaced apart mounting plates extending axially from the cylindrical part to define a tool-receiving space between the mounting plates; a drive shank connected securely to the cylindrical part; and a two-ended reversible tool assembly including first and second driving bits, and an elongated rod having a first end section detachably connected to the first driving bit, and a second end section opposite to the first end section and detachably connected to the second driving bit. The elongated rod is mounted rotatably on the mounting plates of the bifurcated part of the elongated socket, and is rotatable between a first position, where the first end section of the elongated rod and the first driving bit are received and extend axially in the tool-receiving space and where the second end section of the elongated rod and the second driving bit extend axially and outwardly from the tool-receiving space, and a second position, where the second end section of the elongated rod and the second driving bit are received and extend axially in the tool-receiving space and where the first end section of the elongated rod and the first driving bit extend axially and outwardly from the tool-receiving space. The reversible drill/driver tool of the present invention further includes a positioning unit and an urging member. The positioning unit includes a cylindrical sleeve sleeved slidably on the elongated socket, a first engaging member formed on the cylindrical sleeve, and a pair of second engaging members formed on and extending respectively and oppositely from the first and second end sections of the elongated rod in an axial direction relative to the cylindrical part. The cylindrical sleeve is slidable on the elongated socket between a locked position, where the first engaging member engages one of the second engaging members which is formed on the respective one of the first and second end sections which is disposed in the tool-receiving space so as to prevent rotation of the elongated rod and so as to dispose the elongated rod at a respective one of the first and second positions, and an unlocked position, where the first engaging member disengages from said one of the second engaging members so as to permit rotation of the elongated rod relative to the elongated socket. The urging member abuts against the cylindrical sleeve so as to urge the cylindrical sleeve to move to the locked position.

BRIEF DESCRIPTION OF THE DRAWINGS

Other features and advantages of this invention will become more apparent in the following detailed description of the preferred embodiment of this invention, with reference to the accompanying drawings, in which.

DETAILED DESCRIPTION OF THE PREFERRED EMBODIMENT

Figure 1:
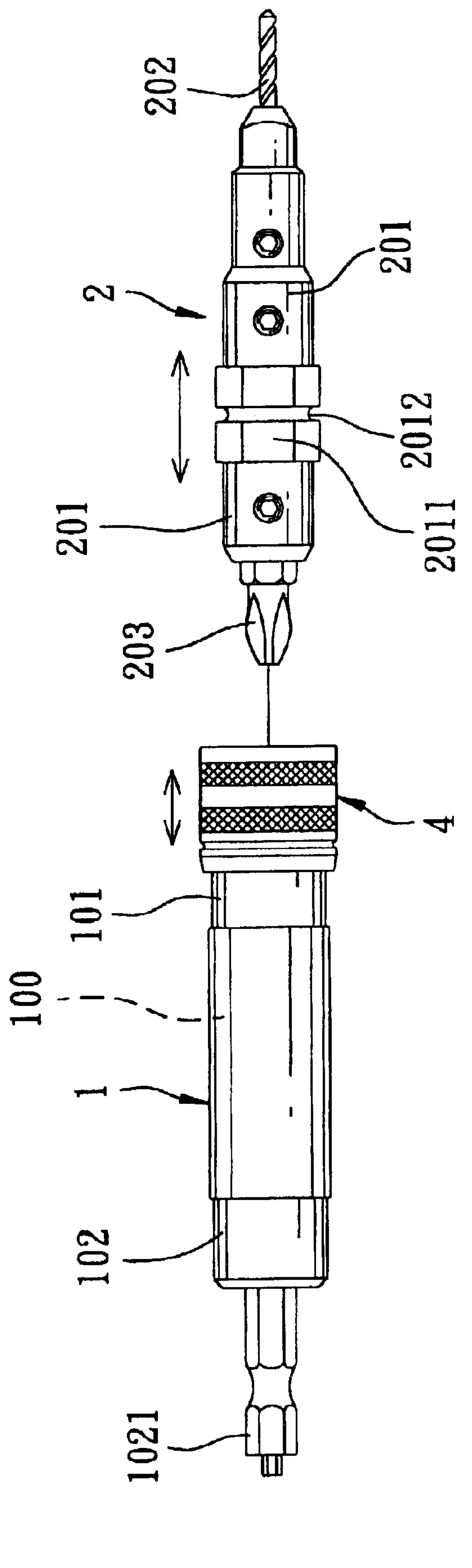
FIG. 1 PRIOR ART
FIG. 1 is a perspective and exploded view of a conventional reversible drill/driver tool for use with a powered drill.
Figure 2:
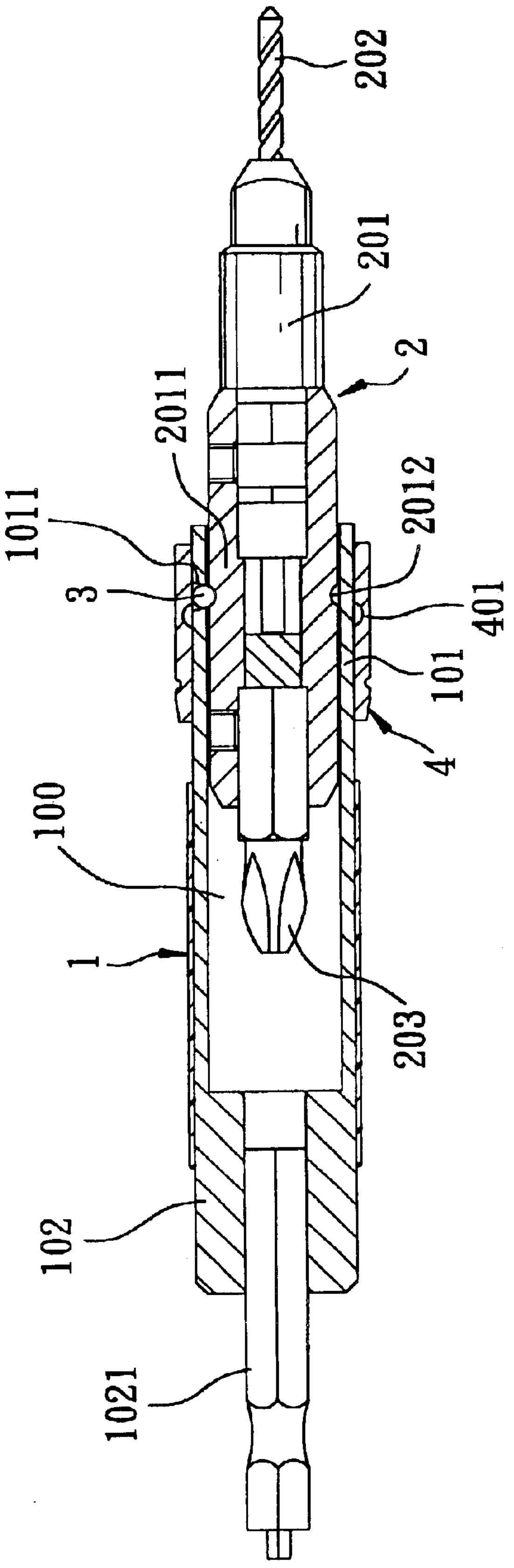
FIG. 2 PRIOR ART
FIG. 2 is a sectional view of the conventional reversible drill/driver tool, showing that a reversible two-ended tool assembly is in a locked position.
Figure 3:
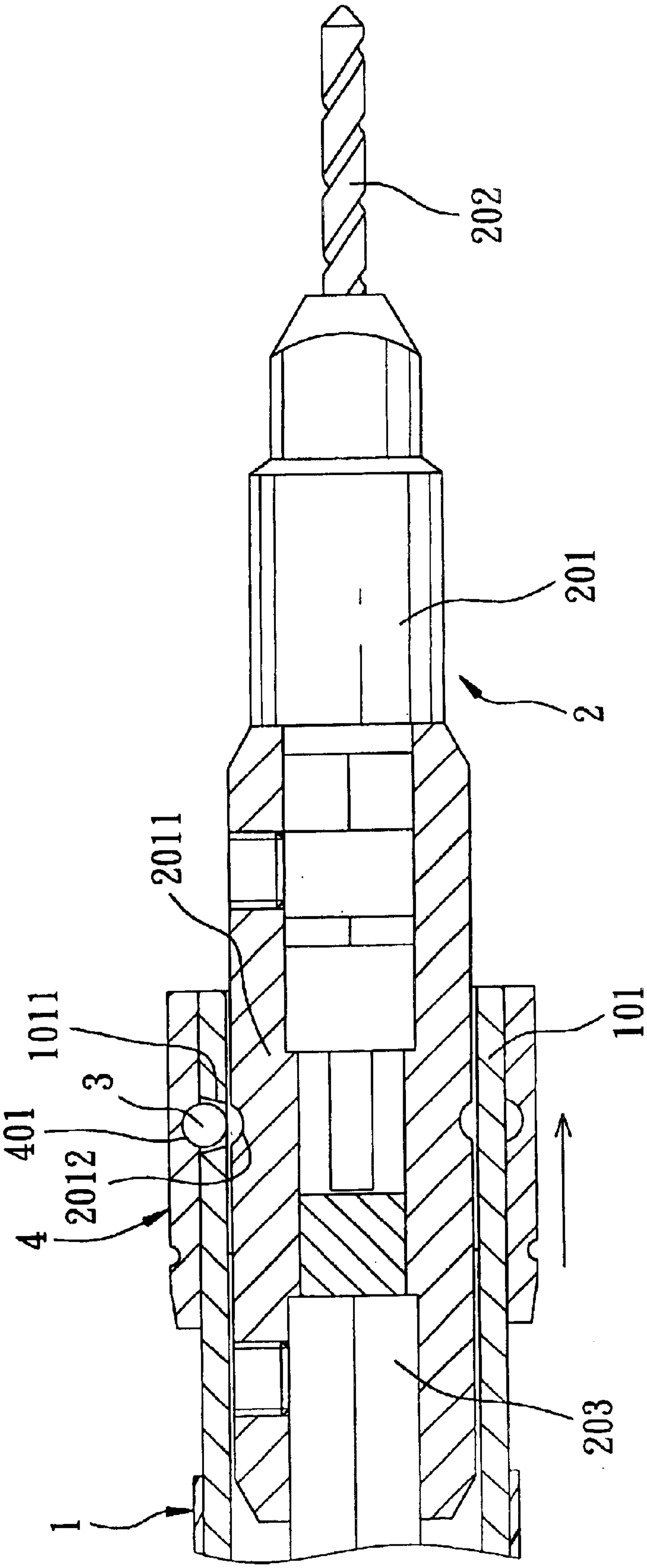
FIG. 3 PRIOR ART
FIG. 3 is a fragmentary sectional view of the conventional reversible drill/driver tool, showing that the reversible two-ended tool assembly is in an unlocked position.
Figure 4:
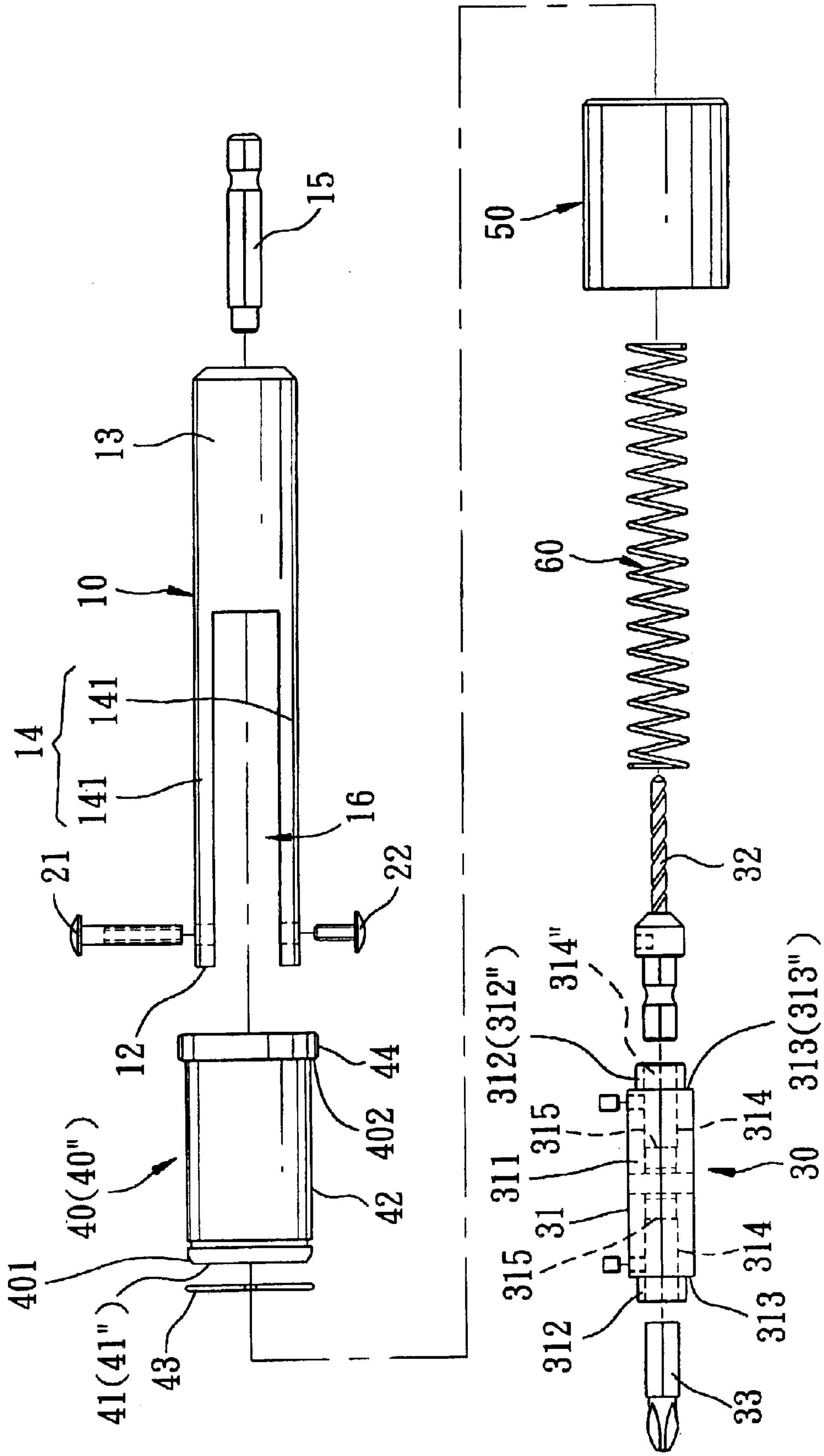
FIG. 4 is an exploded view of the preferred embodiment of a reversible drill/driver tool according to the present invention.
Figure 5:
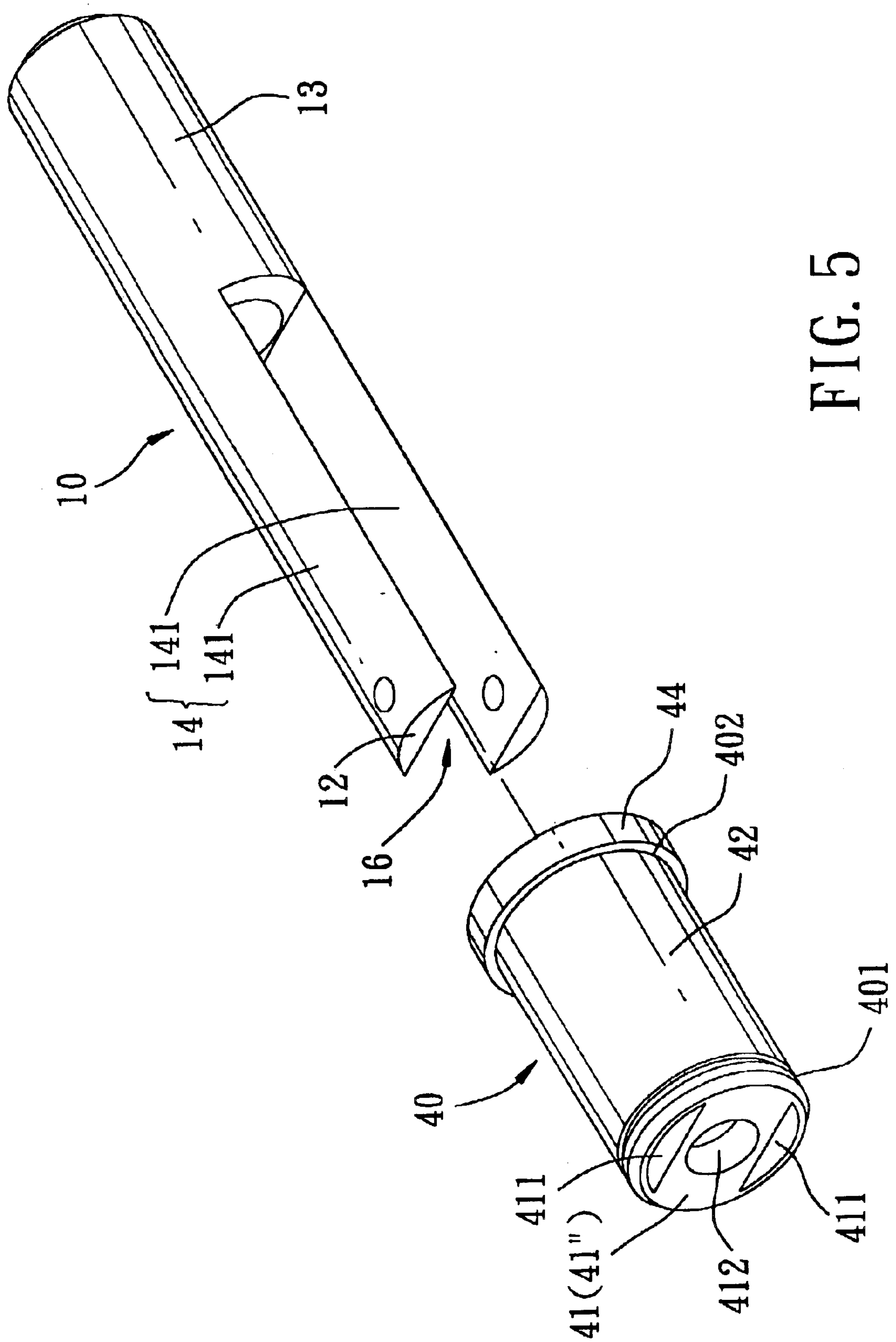
FIG. 5 is a perspective view showing a positioning member and an elongated socket employed in the preferred embodiment.
Figure 6:
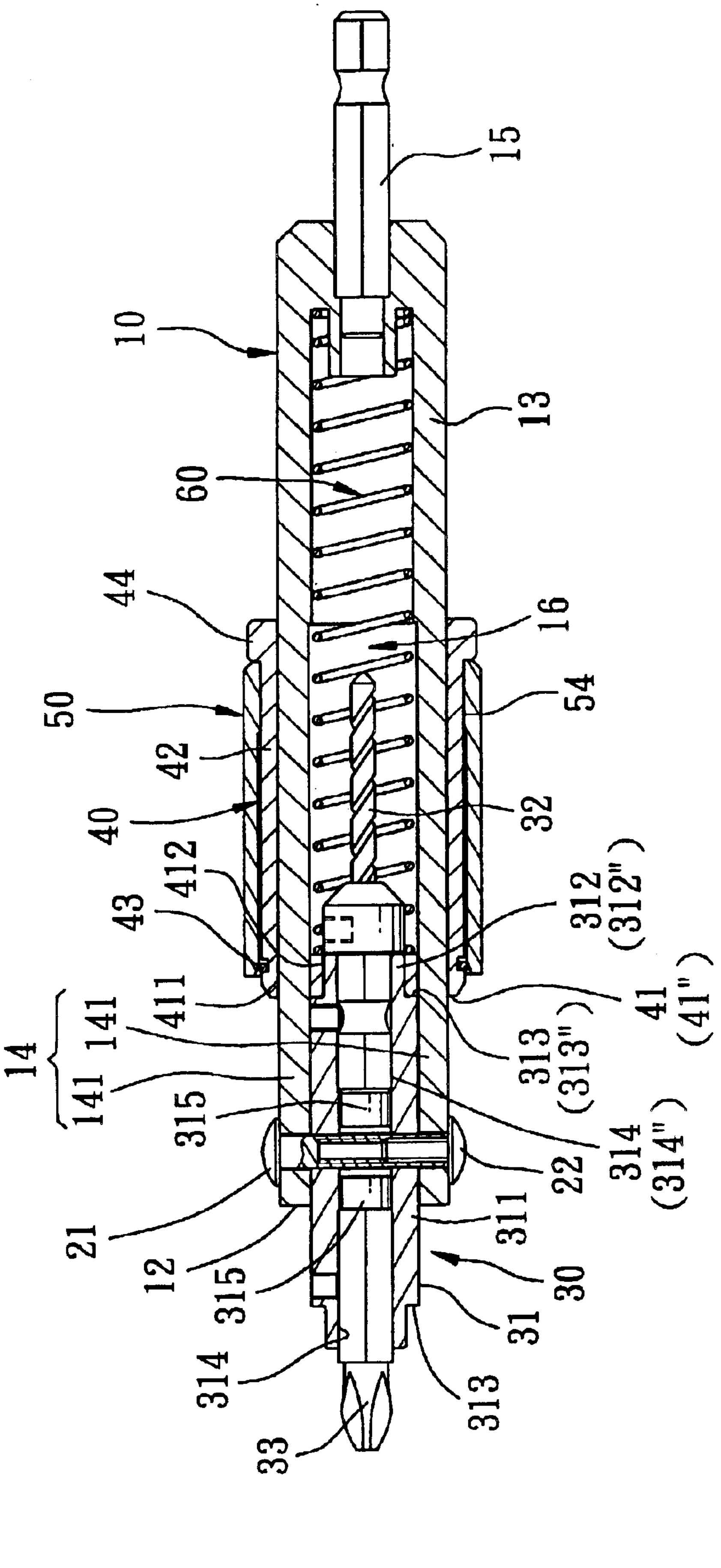
FIG. 6 is a sectional schematic view of the preferred embodiment, with the positioning member moved to a locked position.

Referring to FIGS. 4 to 6, the preferred embodiment of a reversible drill/driver tool according to the present invention is adapted to be mounted on a chuck of a powered drill (not shown), and includes an elongated socket 10, a drive shank 15, a two-ended reversible tool assembly 30, a positioning unit 40, and an urging member 60.

As illustrated, the elongated socket 10 includes a cylindrical part 13, and a bifurcated part 14. The bifurcated part 14 has two spaced apart mounting plates 141 extending axially from the cylindrical part 13 to define a tool-receiving space 16 therebetween.

The drive shank 15 is connected securely to the cylindrical part 13 and is adapted to be connected to the chuck of the powered drill (not shown).

Figure 7:
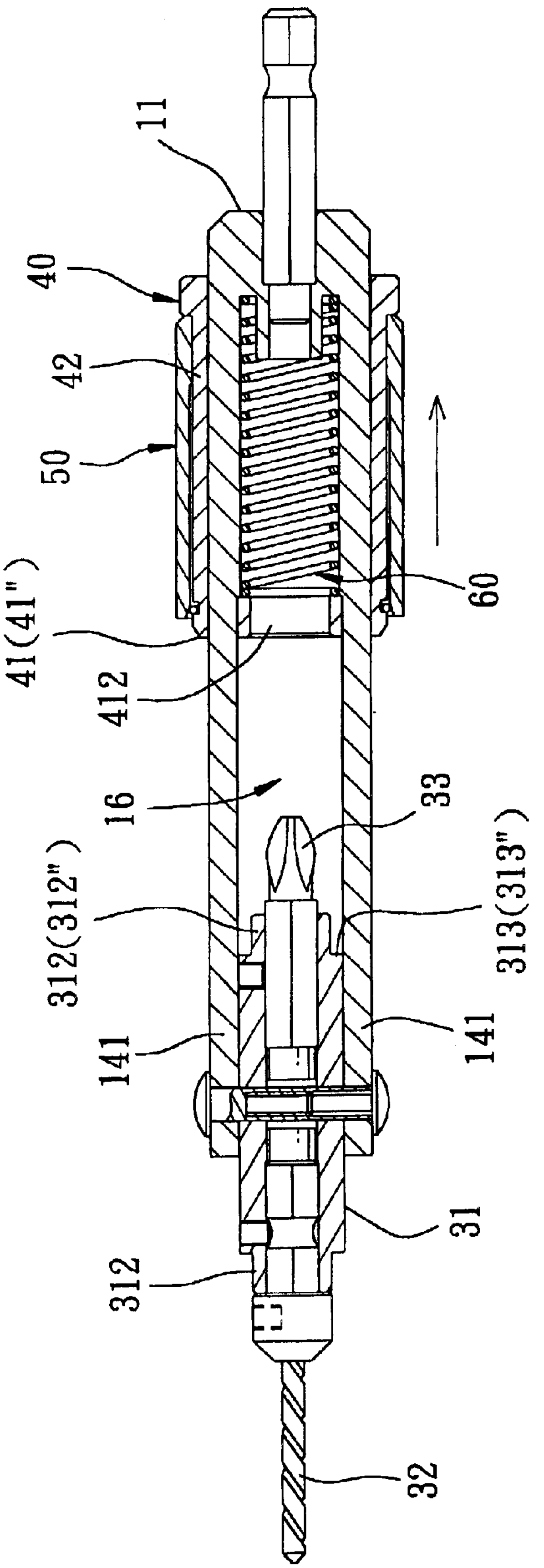
FIG. 7 is a sectional schematic view of the preferred embodiment, with the positioning member moved to an unlocked position.

The two-ended reversible tool assembly 30 includes first and second driving bits 32, 33 (such as a drilling bit and a screwdriver bit), and an elongated rod 31. The elongated rod 31 has a first end section 313 detachably connected to the first driving bit 32, and a second end section 313 opposite to the first end section 313 and detachably connected to the second driving bit 33. The elongated rod 31 is mounted rotatably on two distal ends 12 of the mounting plates 141 of the bifurcated part 14 via a pivot shaft 21 and a fastener screw 22, and is rotatable between a first position, as best shown in FIG. 6, where the first end section 313 of the elongated rod 31 and the first driving bit 32 are received and extend axially in the tool-receiving space 16, and where the second end section 313 of the elongated rod 31 and the second driving bit 33 extend axially and outwardly from the tool-receiving space 16, and a second position, as best shown in FIG. 7, where the second end section 313 of the elongated rod 31 and the second driving bit 33 are received and extend axially in the tool-receiving space 16, and where the first end section 313 of the elongated rod 31 and the first driving bit 32 extend axially and outwardly from the tool-receiving space 16.

The positioning unit 40 includes a cylindrical sleeve 42, a first engaging member 41, and a pair of second engaging members 312. The cylindrical sleeve 42 is sleeved slidably on the elongated socket 10. The first engaging member 41 is formed on the cylindrical sleeve 42. The second engaging members 312 are formed on and extend respectively and oppositely from the first and second end sections 313 of the elongated rod 31 in an axial direction relative to the cylindrical part 14. The cylindrical sleeve 42 is slidable on the elongated socket 10 between a locked position, as shown in FIG. 6, where the first engaging member 41 engages one of the second engaging members 312, which is formed on the respective one of the first and second end sections 313 which is disposed in the tool-receiving space 16 so as to prevent rotation of the elongated rod 31 relative to the elongated socket 10 and so as to dispose the elongated rod 31 at a respective one of the first and second positions, and an unlocked position, as shown in FIG. 7, where the first engaging member 41 disengages from the respective one of the second engaging members 312 so as to permit rotation of the elongated rod 31 relative to the elongated socket 10.

The urging member 60 abuts against the cylindrical sleeve 42 so as to urge the cylindrical sleeve 42 to move to the locked position.

In this preferred embodiment, each of the second engaging members 312 includes a tubular stud 312" that is reduced from and that cooperates with the respective one of the first and second end sections 313 of the elongated rod 31 to define an abutment shoulder 313" therebetween. The cylindrical sleeve 42 has a first engaging end 401 formed with an annular flange 41" extending radially and inwardly therefrom to confine a through-hole 412 that defines the first engaging member 41. The annular flange 41" is formed with a pair of opposing plate-extension apertures 411 for extension of the mounting plates 141 therethrough so as to permit mounting of the cylindrical sleeve 42 on the elongated socket 10. When the cylindrical sleeve 42 is positioned at the locked position, as illustrated in FIG. 6, the tubular stud 312" extends fittingly into and through the through-hole 412 in the annular flange 41", and the annular flange 41" abuts against the abutment shoulder 313" by virtue of the urging action of the urging member 60. Under this condition, the tool of the present invention can serve as a screwdriver.

Each of the first and second end sections 313 of the elongated rod 31 is formed with an axially extending blind channel 314 of non-circular cross-section. Each of the tubular studs 312" of the second engaging members 312 defines a bit-receiving hole 314" of non-circular cross section that is aligned with and that is in spatial communication with a respective one of the blind channels 314, and that receives and engages the respective one of the first and second driving bits 32, 33.

The two-ended reversible tool assembly 30 further includes two magnet pieces 315 mounted respectively in the blind channels 314 in the first and second end sections 313 of the elongated rod 31 so as to attract and thus enhance positioning of the first and second driving bits 32, 33, respectively.

Figure 8:
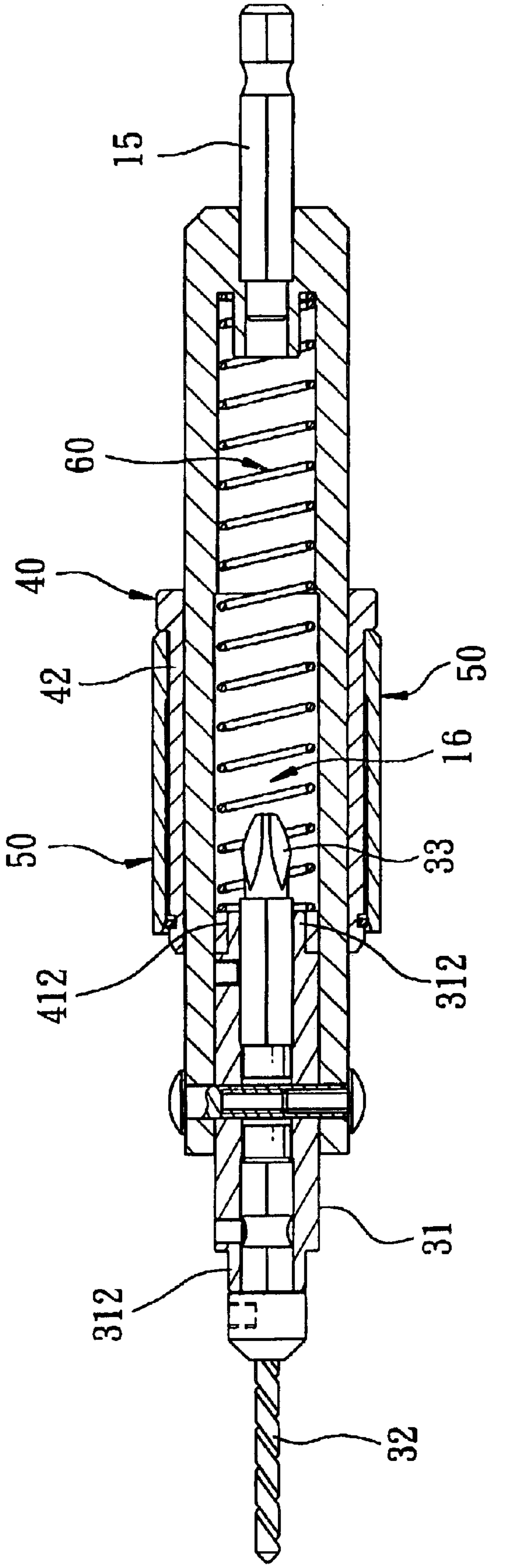
FIG. 8 is a sectional schematic view of the preferred embodiment, showing a state where a tubular member is retracted and is retained on the positioning member.
Figure 9:
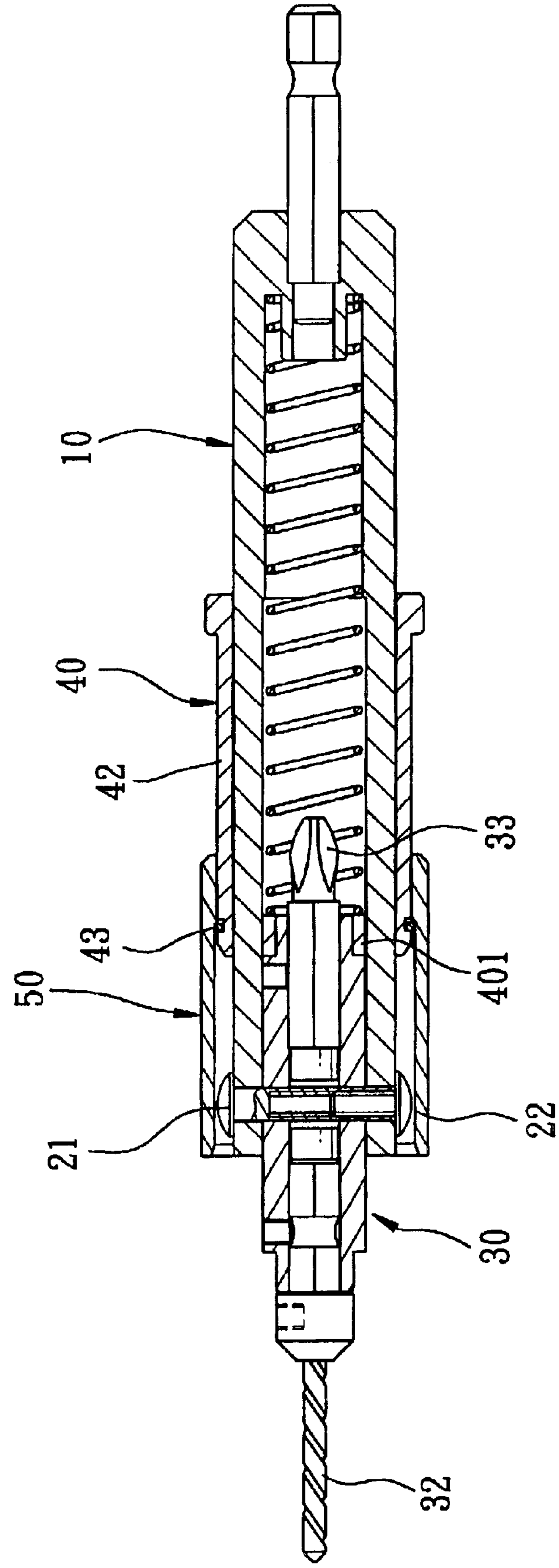
FIG. 9 is a sectional schematic view of the preferred embodiment, showing a state where the tubular member is extended outwardly from the positioning member to facilitate gripping of the preferred embodiment.

The preferred embodiment of the present invention further includes a tubular member 50 that is sleeved slidably on the cylindrical sleeve 42 of the positioning member 40 and that is slidable on the cylindrical sleeve 42 from a retracted position (see FIG. 8) to an extended position (see FIG. 9), where the tubular member 50 projects outwardly and axially from the first engaging end 401 of the cylindrical sleeve 42 so as to increase total length of assembly of the tubular member 50 and the cylindrical sleeve 42 to facilitate gripping of the drill/driver tool of the present invention. At the extended position, the cylindrical sleeve 42 covers the pivot shaft 21 and the fastener screw 22 for safety purposes. The cylindrical sleeve 42 further has a second engaging end 402 opposite to the first engaging end 401, and a stop flange 44 extending radially and outwardly from the second engaging end 402 of the cylindrical sleeve 42 so as to abut against the tubular member 50 when the latter is moved to the retracted position. An annular stop ring 43 is disposed between the tubular member 50 and the first engaging end 401 of the cylindrical sleeve 42 to prevent removal of the tubular member 50 from the cylindrical sleeve 42.

When changing the position of the driving bit 32,33, the operator only needs to move the cylindrical sleeve 42 against the urging action of the urging member 60 to the unlocked position so as to permit disengagement between the first engaging member 41 and one of the second engaging members 312 and so as to permit rotation of the elongated rod 31 relative to the bifurcated part 14. The cylindrical sleeve 42 moves back to the locked position upon release therealong. Thus, the aforesaid disadvantages as encountered during use of the conventional reversible drill/driver tool can be eliminated.

With this invention thus explained, it is apparent that numerous modifications and variations can be made without departing from the scope and spirit of this invention. It is therefore intended that the invention be limited only as indicated in the appended claims.

I claim:

1. A reversible drill/driver tool for use with a powered drill having a chuck, comprising:

an elongated socket including a cylindrical part, and a bifurcated part having two spaced apart mounting plates extending axially from said cylindrical part to define a tool-receiving space between said mounting plates;

a drive shank connected securely to said cylindrical part;

a reversible two-ended tool assembly including first and second driving bits, and an elongated rod having a first end section detachably connected to said first driving bit, and a second end section opposite to said first end section and detachably connected to said second driving bit, said elongated rod being mounted rotatably on said mounting plates of said bifurcated part of said elongated socket and being rotatable between a first position, where said first end section of said elongated rod and said first driving bit are received and extend axially in said tool-receiving space and where said second end section of said elongated rod and said second driving bit extend axially and outwardly from said tool-receiving space, and a second position, where said second end section of said elongated rod and said second driving bit are received and extend axially in said tool-receiving space and where said first end section of said elongated rod and said first driving bit extend axially and outwardly from said tool-receiving space;

a positioning unit including a sleeve mounted slidably on said elongated socket, a first engaging member formed on said sleeve, and a pair of second engaging members formed on and extending respectively and oppositely from said first and second end sections of said elongated rod in an axial direction relative to said cylindrical part, said sleeve being slidable between a locked position, where said first engaging member engages one of said second engaging members which is formed on the respective one of said first and second end sections which is disposed in said tool-receiving space so as to prevent rotation of said elongated rod and so as to dispose said elongated rod at a respective one of said first and second positions, and an unlocked position, where said first engaging member disengages from said one of said second engaging members so as to permit rotation of said elongated rod relative to said elongated socket; and an urging member abutting against said sleeve so as to urge said sleeve to move to said locked position.

2. The reversible drill/driver tool as defined in claim 1, wherein each of said second engaging members includes a tubular stud that is reduced from and that cooperates with the respective one of said first and second end sections of said elongated rod to define an abutment shoulder therebetween, said sleeve having an engaging end formed with an annular flange extending radially and inwardly therefrom and confining a through-hole that defines said first engaging member, said annular flange being formed with a pair of opposing plate-extension apertures for extension of said mounting plates therethrough so as to permit mounting of said cylindrical sleeve on said elongated socket, said tubular stud extending fittingly into and through said through-hole in said annular flange and said abutment shoulder abutting against said annular flange when said sleeve is positioned at said locked position.

3. The reversible drill/driver tool as defined in claim 2, wherein each of said first and second end sections of said elongated rod is formed with an axially extending blind channel of non-circular cross-section, each of said tubular studs of said second engaging members defining a bit-receiving hole of non-circular cross section that is aligned with and that is in spatial communication with a respective one of said blind channels and that receives and engages the respective one of said first and second driving bits.

4. The reversible drill/driver tool as defined in claim 3, wherein said two-ended reversible tool assembly further includes two magnet pieces mounted respectively in said blind channels in said first and second end sections of said elongated rod so as to attract said first and second driving bits, respectively.

5. The reversible drill/driver tool as defined in claim 4, further comprising a tubular member sleeved slidably on said sleeve of said positioning member and slidable from a retracted position to an extended position, in which said tubular member projects outwardly and co-axially from said engaging end of said sleeve so as to increase total length of assembly of said tubular member and said sleeve to facilitate gripping of said drill/driver tool.

* * * * *